United States Patent [19]

Arms et al.

[11] Patent Number: 5,497,147
[45] Date of Patent: Mar. 5, 1996

[54] DIFFERENTIAL VARIABLE RELUCTANCE TRANSDUCER

[75] Inventors: Steven W. Arms; Christopher P. Townsend, both of Burlington, Vt.

[73] Assignee: MicroStrain, Company, Burlington, Vt.

[21] Appl. No.: 78,467

[22] Filed: Jun. 21, 1993

[51] Int. Cl.⁶ .................................................. G08C 19/06
[52] U.S. Cl. ................... 340/870.35; 340/870.31; 340/870.33; 324/207.15
[58] Field of Search .................. 340/870.31, 870.32, 340/870.33, 870.35, 539, 870.36; 324/207.15–207.19

[56] References Cited

U.S. PATENT DOCUMENTS

| | | | |
|---|---|---|---|
| 3,543,145 | 4/1968 | Dufayet | 324/237 |
| 3,654,549 | 4/1972 | Maurer et al. | 340/870.31 |
| 3,756,081 | 9/1973 | Young | 340/870.31 |
| 4,121,185 | 10/1978 | Genz | 340/870.33 |
| 4,350,954 | 9/1982 | Seilly | 324/207.18 |
| 4,623,840 | 11/1986 | Fujimura et al. | 324/207.18 |
| 4,667,158 | 5/1987 | Redlich | 340/870.36 |
| 4,813,435 | 3/1989 | Arms | 128/774 |

FOREIGN PATENT DOCUMENTS

| | | | |
|---|---|---|---|
| 8700951 | 2/1987 | WIPO | 340/870.36 |
| 9208945 | 5/1992 | WIPO | 324/207.16 |

Primary Examiner—John K. Peng
Assistant Examiner—Daniel J. Wu
Attorney, Agent, or Firm—Thomas N. Neiman

[57] ABSTRACT

The novel differential variable reluctance transducer and telemetry system is comprised of a ultra miniaturized device encased in stainless steel. The system contains a free sliding, magnetically permeable, stainless core and two coils surrounding the core. The position of the core is detected by measuring the coils' differential reluctance. The coils resonate at a frequency which depends on the position of the core and the difference in resonant frequency is used to modulate a high frequency carrier. This radio frequency signal is transmitted for remote reception by an FM receiver, amplified and put through a phase-locked-loop circuit into a microprocessor for counting and displaying.

3 Claims, 2 Drawing Sheets

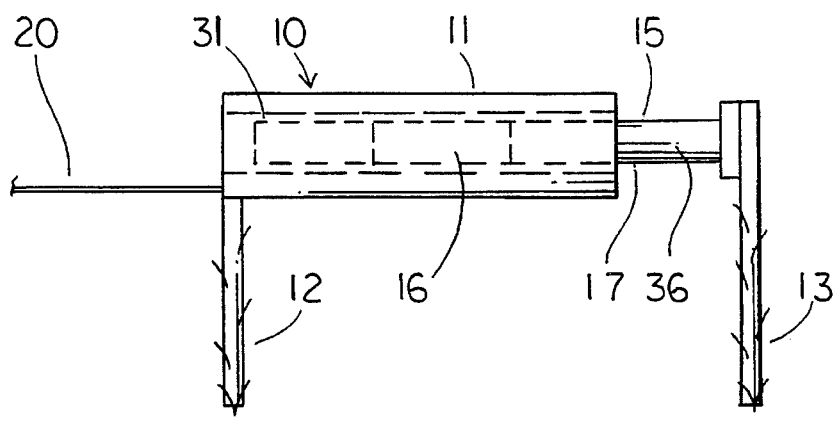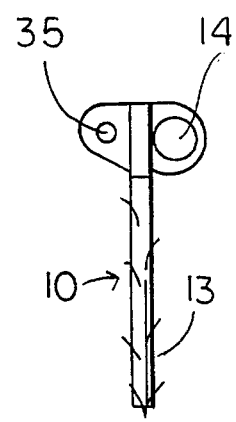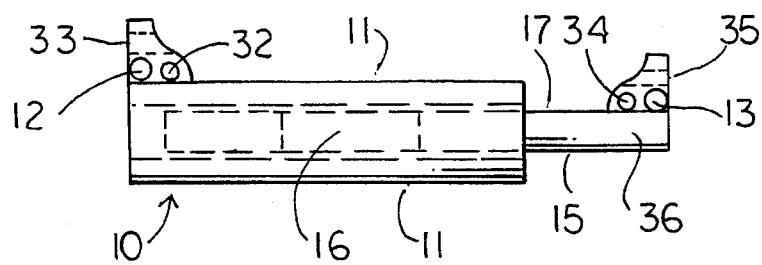

5,497,147

DIFFERENTIAL VARIABLE RELUCTANCE TRANSDUCER

BACKGROUND OF THE INVENTION

This invention pertains to devices for measuring strain and, in particular, to a differential variable reluctance transducer and telemetry system for use in delicate or hard to reach areas.

There have been a number of attempts to develop highly accurate miniaturized sensors to be used by the medical profession and by industry to measure strains. Examples of this type device are many systems using Hall Effect displacement sensors. The U.S. Pat. No. 4,813,435 issued to Steven W. Arms, issued on 21 Mar. 1989 is an example of this type system. Other attempts in this area include the U.S. Pat. No. 4,667,158 issued to Robert W. Redlich, issued on 19 May 1987 and to Alec H. Seilly, U.S. Pat. No. 4,350,954 issued on 21 Sep. 1982. There are, however many difficulties with those type devices. Among the difficulties are moisture problems, noise interference, core rotation artifact, and limited linear range.

What is needed is a system which is simple and easy to use, has increased linear range and higher signal to noise ratio which are inherent in a differential variable reluctance transducer. What is also needed are micro power circuitry for use in the system and a telemetry system which will allow the user to count and monitor remote signals from the transducer for ease of evaluation.

It is the object of this invention to teach a differential variable transducer and telemetry system which avoids the disadvantages and limitations, recited above in similar systems. Another object of this invention is to provide an system that is simple to operate, extremely effective and very cost effective with sufficient power and accuracy, at the same time, be extremely efficient.

SUMMARY OF THE INVENTION

Particularly, it is the object of this invention to teach a differential variable reluctance and telemetry system, for use in industrial and medical research applications to measure strains in areas previously considered inaccessible, comprising a housing; said housing comprising a hollow tubular structure; said housing having positioning means at least one end of said housing; said housing further having removal means attached; slideable core means located within said housing; said slideable core means having positioning means attached; said slideable core means further having removal means attached; said slideable core means comprising a magnetically permeable metallic center; said permeable metallic center having a circumference of stainless steel; a plurality of coils surrounding said core means; said coils having implanting means for positioning said coils within said housing; said coils further having circuitry means attached thereto; and said circuitry means having signal sending means attached.

BRIEF DESCRIPTION OF THE DRAWINGS

Further objects and features of this invention will become more apparent by reference to the following description taken in conjunction with the following figures, in which:

FIG. 1 is a top plan cross-sectional view of the novel differential variable reluctance transducer;

FIG. 2 is cross sectional view taken along line 2—2 of FIG. 1;

FIG. 3 is a side elevational view thereof;

DETAILED DESCRIPTION OF THE PREFERRED EMBODIMENT

Figure 4:
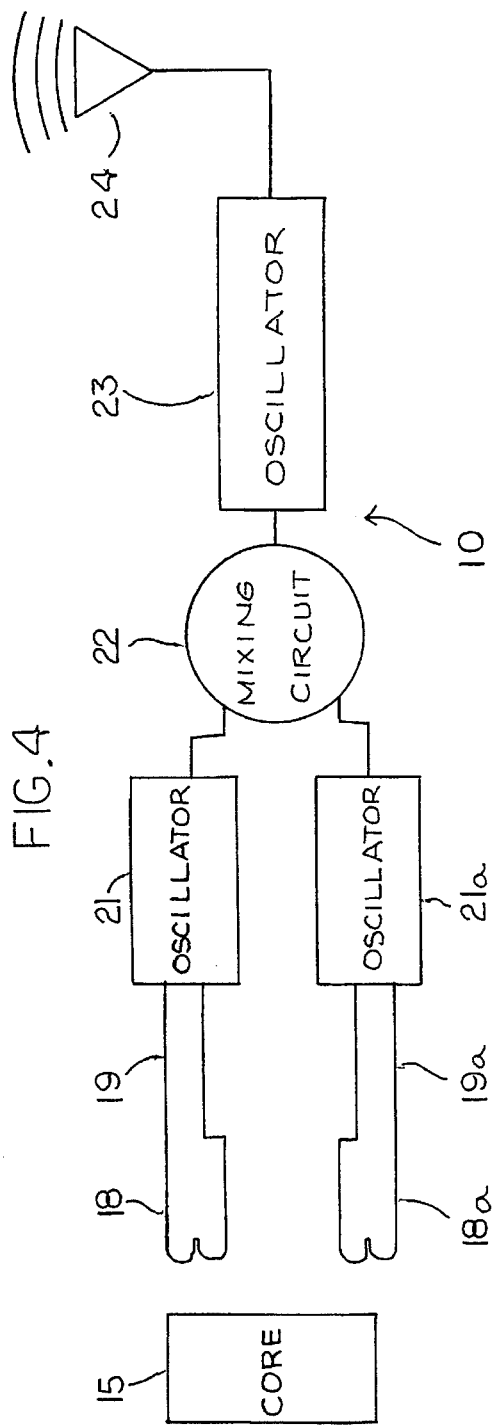
FIG. 4 is a block diagram of the transmitting system thereof.
Figure 5:
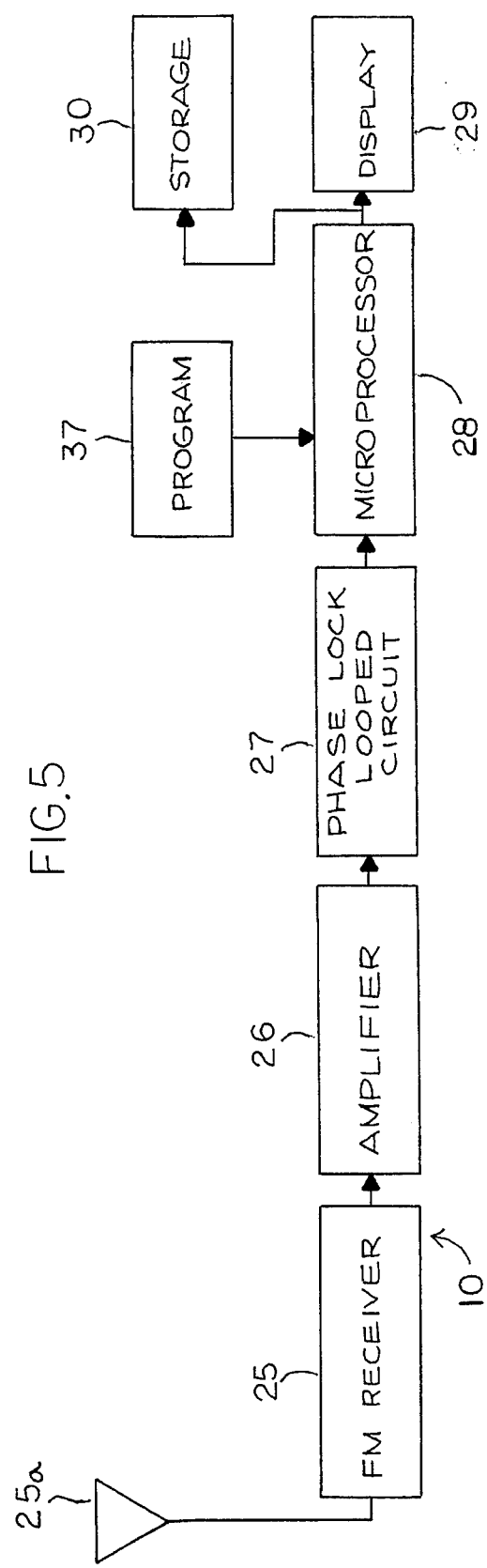
FIG. 5 is a block diagram of the receiving system thereof.

As shown in the figures, the novel system 10 comprises a housing 11 that is comprised of a hollow tubular structure. The housing is positioned by means of a barbed probe 12 attached at one end of the housing 11. The housing surrounds a bobbin 31 which may be formed of a stainless steel tube or other materials. The barbed probe has an aperture 32 for positioning and an aperture 33 for the removal of the system. A second barbed probe 13 has an aperture 14 into which one end of the core 15 is attached. The barbed probe 13 also has a positioning aperture 34 and a removal aperture 35. The core 15 is inserted into the bobbin 31, but can slide freely within the bobbin 31. The barbs can also be replaced by adhesive attaching pads. The slideable core 15 is comprised of a magnetically permeable metallic center 16 having a stainless steel circumference 17. A reinforcement 36 comprised of a non-permeable material fixed within the stainless steel circumference 17. A plurality of coils 18 and 18a are wrapped around the bobbin 31 and epoxy potted into position within the housing 11. These coils may also be formed by vacuum deposition of conductive material onto the bobbin 31, and subsequent controlled photolithographic or laser micro machining for removal of conductive material to produce a bonded coil on the bobbin 31. The coils 18 and 18a are attached to wire circuits 19 and 19a that are encased in a flexible plastic circuit 20 and are directed individually into oscillators 21 and 21a which resonate at a frequency dependent on core position. A mixing circuit 22 combines those frequencies, providing the frequency difference between each of the oscillators 21 and 21a. This difference is sent to a high frequency carrier oscillator 23 and is used to modulate the high frequency carrier. This frequency modulated carrier signal is sent to an FM antenna 24 for wireless data transmission.

The receiving system is comprised of an FM receiver 25 having a receiving antenna 25a which receives a signal from the FM antenna 24. The signal is then sent through an amplifier 26 and then enters a phase-locked-loop circuit 27 which clarifies the signal and sends the signal to a microprocessor 28 which counts the signal and then displays 29 and stores 30 the information. Software 37 controls the function of the microprocessor and is used to access calibration files for specific differential variable reluctance transducers.

The operation of the novel differential variable reluctance transducer and telemetry system is enhanced by being ultra miniaturized to allow access to delicate or hard to reach structures. The stainless steel encased device is comprised of two coils and a free sliding, magnetically permeable core. Core movements cause one coils' reluctance to be increased, while the other is decreased. The difference is a very sensitive measurement of the core's position. Temperature changes cause each coil's reluctance to change similarly, thereby cancelling out these efforts. The electrical connections are potted in epoxy within the casing which results in outstanding moisture resistance. A flex circuitry in the form of flexible polymide tape cable is used to overcome the limitations of simple conventional wires, such as, severe fatigue and the time involved in soldering individual fine wires. Measurement of the core's position can also be accomplished by measuring the coils differential reluctance using sinewave excitation and a synchronous demodulator.

While we have described our invention in connection with specific embodiments thereof, it is clearly to be understood that this is done only by way of example and not as a limitation to the scope of our invention as set forth in the objects thereof and in the appended claims.

We claim:

1. Differential variable reluctance transducer and telemetry system, for use in industrial and medical research applications to measure strains in areas previously considered inaccessible, comprising:

a housing;

said housing comprising a hollow tubular structure;

said housing further comprising a stainless steel tube;

said housing having positioning means attached at least one end of said housing;

said housing further having removal means attached;

slideable core means located within said housing;

said slideable core means having positioning means attached;

said slideable core means further having removal means attached;

said slideable core means comprising a magnetically permeable metallic center;

said permeable metallic center having a circumference of stainless steel;

a plurality of coils surrounding said slideable core means;

said coils having implanting means for positioning said coils within said housing;

said coil implanting means comprising potting said coils in epoxy;

said coils further having circuitry means attached thereto;

said circuitry means comprising wire means;

said wire means having flexible polymeric means surrounding said wire means for permitting protection and flexibility;

said circuitry means having signal sending means attached;

said signal sending means comprising a transmitting system;

said transmitting system comprising oscillators attached to each of said coils for controlling the frequency of resonance of said coils;

said transmitting system further comprising a mixing circuit for producing the frequency difference between said coils;

said transmitting system further comprising a high frequency oscillator for wireless data transmission which is modulated by said frequency differences;

said transmitting system further comprising an FM antenna; and said circuitry means further comprising a receiving system for receiving a signal from said FM antenna.

2. Differential variable reluctance transducer and telemetry system, according to claim 1, wherein:

said receiving system comprises an FM receiver;

said receiving system further comprises an amplifier for increasing the volume of the signal;

said receiving system further comprises a phase-locked-loop circuit for tracking and clarifying the signal;

said receiving system further having a microprocessor for counting and evaluating the signal.

3. Differential variable reluctance transducer and telemetry system, according to claim 2, wherein:

said microprocessor having display means; and said microprocessor further having storage means.

* * * * *